(12) United States Patent
Balkenhol et al.

(10) Patent No.: US 10,966,404 B2
(45) Date of Patent: Apr. 6, 2021

(54) QUICK-COUPLING DEVICE

(71) Applicant: GEA Farm Technologies GmbH, Bönen (DE)

(72) Inventors: Reinhard Balkenhol, Paderborn (DE); Magnus Wiethoff, Welver (DE); Niek Noeverman, PB Marienberg (NL); Harald Grundner, Hockenheim (DE)

(73) Assignee: GEA Farm Technologies, GmbH, Bönen (DE)

( * ) Notice: Subject to any disclaimer, the term of this patent is extended or adjusted under 35 U.S.C. 154(b) by 669 days.

(21) Appl. No.: 15/578,981

(22) PCT Filed: Jun. 2, 2016

(86) PCT No.: PCT/EP2016/062569
§ 371 (c)(1),
(2) Date: Dec. 1, 2017

(87) PCT Pub. No.: WO2016/193399
PCT Pub. Date: Dec. 8, 2016

(65) Prior Publication Data
US 2018/0132444 A1 May 17, 2018

(30) Foreign Application Priority Data
Jun. 5, 2015 (DE) .................... 20 2015 003 900 U

(51) Int. Cl.
*A01J 5/04* (2006.01)
*F16L 23/10* (2006.01)
(Continued)

(52) U.S. Cl.
CPC ................ *A01J 5/044* (2013.01); *A01J 7/02* (2013.01); *F16L 23/10* (2013.01); *F16L 29/007* (2013.01);
(Continued)

(58) Field of Classification Search
CPC .... A01J 5/044; A01J 7/00; A01J 7/005; A01J 7/02; F16L 23/10; F16L 29/007;
(Continued)

(56) References Cited

U.S. PATENT DOCUMENTS 1,093,868 A * 4/1914 Leighty .................. F16L 19/04
285/334.1
1,385,751 A * 7/1921 Read ...................... A01J 5/044
119/14.1
(Continued)

FOREIGN PATENT DOCUMENTS

DE 898693 C 10/1953
DE 2705323 C3 12/1979
(Continued)

OTHER PUBLICATIONS

International Search Report for International Application No. PCT/EP2016/062569 dated Aug. 23, 2016, 2 pages.
(Continued)

*Primary Examiner* — David Colon-Morales
(74) *Attorney, Agent, or Firm* — Smith Law Office; Jeffry W. Smith

(57) ABSTRACT

A quick-coupling device for a milking module of a milking system for milking dairy animals that forms a releasable and re-establishable connection between the milking module and a milk pipe and includes a valve mechanism for opening and closing a feeding port and a discharge port using a number of articulated clamps.

16 Claims, 14 Drawing Sheets

(51) Int. Cl.
  *F16L 29/00* (2006.01)
  *F16L 55/105* (2006.01)
  *A01J 7/02* (2006.01)
  *F16K 1/12* (2006.01)
  *F16K 1/38* (2006.01)

(52) U.S. Cl.
  CPC .............. *F16L 55/105* (2013.01); *F16K 1/12* (2013.01); *F16K 1/38* (2013.01)

(58) Field of Classification Search
  CPC ........... F16L 29/00; F16L 55/105; F16K 1/12; F16K 1/38
  USPC ........................................................ 251/146
  See application file for complete search history.

(56) References Cited

U.S. PATENT DOCUMENTS

| | | | | |
|---|---|---|---|---|
| 1,758,443 | A * | 5/1930 | Jansson | A01J 5/044 137/205 |
| 2,277,229 | A * | 3/1942 | Hulbert | A01J 5/044 439/191 |
| 2,426,471 | A * | 8/1947 | Snyder | F16L 29/007 137/614.06 |
| 2,703,100 | A * | 3/1955 | Perkins | A01J 7/005 137/455 |
| 2,763,459 | A * | 9/1956 | Anderson | A01J 5/044 251/147 |
| RE24,406 | E * | 12/1957 | Weir | A01J 5/044 251/149.5 |
| 2,881,010 | A * | 4/1959 | Bouma | F16L 41/12 251/127 |
| 2,949,276 | A * | 8/1960 | Merritt | B08B 9/032 251/146 |
| 3,010,478 | A * | 11/1961 | Buck | F16L 55/105 137/561 R |
| 3,011,755 | A * | 12/1961 | Babson | F16K 51/00 251/146 |
| 3,070,067 | A * | 12/1962 | Fjermestad | A01J 5/044 119/14.36 |
| 3,164,360 | A * | 1/1965 | Stafford | E02B 13/02 251/146 |
| 3,545,719 | A * | 12/1970 | Shulick | A01J 5/044 251/146 |
| 3,591,132 | A * | 7/1971 | Johnston | F16K 3/02 251/146 |
| 3,874,337 | A * | 4/1975 | Umbaugh | A01J 5/0133 119/14.15 |
| 3,966,240 | A * | 6/1976 | Enomoto | F16L 23/10 285/367 |
| 4,114,565 | A * | 9/1978 | Dode | A01J 5/044 119/14.01 |
| 4,261,291 | A | 4/1981 | Wakui et al. | |
| 4,344,385 | A * | 8/1982 | Swanson | A01J 5/04 119/14.08 |
| 4,372,345 | A * | 2/1983 | Mehus | A01J 7/02 119/14.18 |
| 4,376,454 | A | 3/1983 | Schulte | |
| 4,568,115 | A * | 2/1986 | Zimmerly | F16L 23/10 24/285 |
| 4,582,022 | A * | 4/1986 | Noorlander | A01J 5/041 119/14.32 |
| 5,368,069 | A * | 11/1994 | Felber | F16K 15/038 137/512.1 |
| 5,632,227 | A | 5/1997 | Bücker | |
| 5,653,481 | A * | 8/1997 | Alderman | F16B 31/04 24/279 |
| 5,887,619 | A * | 3/1999 | Keary | F16K 15/063 137/614.18 |
| 5,947,533 | A * | 9/1999 | Fisher | F16L 23/22 277/614 |
| 6,014,945 | A * | 1/2000 | Gustafson | A01J 5/044 119/14.01 |
| 6,354,636 | B2 * | 3/2002 | Matsuzawa | F16L 23/08 285/334.5 |
| 6,755,445 | B2 * | 6/2004 | Balamuta | F04B 39/123 285/12 |
| 7,066,108 | B2 * | 6/2006 | Andersson | A01J 5/0175 119/14.08 |
| 7,644,960 | B2 * | 1/2010 | Casey, Sr. | F16L 23/22 285/367 |
| 7,883,121 | B2 * | 2/2011 | Henry | F16L 23/10 285/410 |
| 8,196,971 | B2 * | 6/2012 | Hansen | F16L 23/10 285/367 |
| 8,256,378 | B2 * | 9/2012 | Van Berkel | A01J 5/044 119/14.18 |
| 8,327,799 | B2 * | 12/2012 | Gudmundsson | A01J 5/045 119/14.01 |
| 8,371,623 | B2 * | 2/2013 | Bronnert | F16L 23/06 285/409 |
| 8,925,483 | B2 * | 1/2015 | Torgerson | A01J 5/007 119/14.08 |
| 8,925,484 | B2 * | 1/2015 | Maier, Jr. | A01J 7/00 119/14.18 |
| 9,151,420 | B2 * | 10/2015 | McKiernan | F16L 23/10 |
| 9,249,909 | B2 * | 2/2016 | Ikushima | F16K 27/02 |
| 9,918,450 | B2 | 3/2018 | Krone et al. | |
| 10,088,060 | B2 * | 10/2018 | Sundrla | F16K 27/044 |
| 10,480,694 | B2 * | 11/2019 | Bekkevold | E21B 33/038 |
| 2010/0253009 | A1 * | 10/2010 | Yoshitomi | F16L 23/10 277/608 |
| 2014/0346771 | A1 * | 11/2014 | Thompson | F16L 27/082 285/281 |

FOREIGN PATENT DOCUMENTS

| | | |
|---|---|---|
| DE | 102007010644 A1 | 9/2007 |
| EP | 0671875 B2 | 5/2000 |
| SU | 640083 A1 | 12/1978 |
| WO | 2013/135842 A1 | 9/2013 |

OTHER PUBLICATIONS

German Search Report for German Application No. 202015003900.6 dated Feb. 1, 2016, 3 pages.
"ISO 2852: Stainless Steel Clamp Pipe Couplings for the Food Industry"; International Standard; Second Edition, Jun. 15, 1993; 20 pages.

* cited by examiner

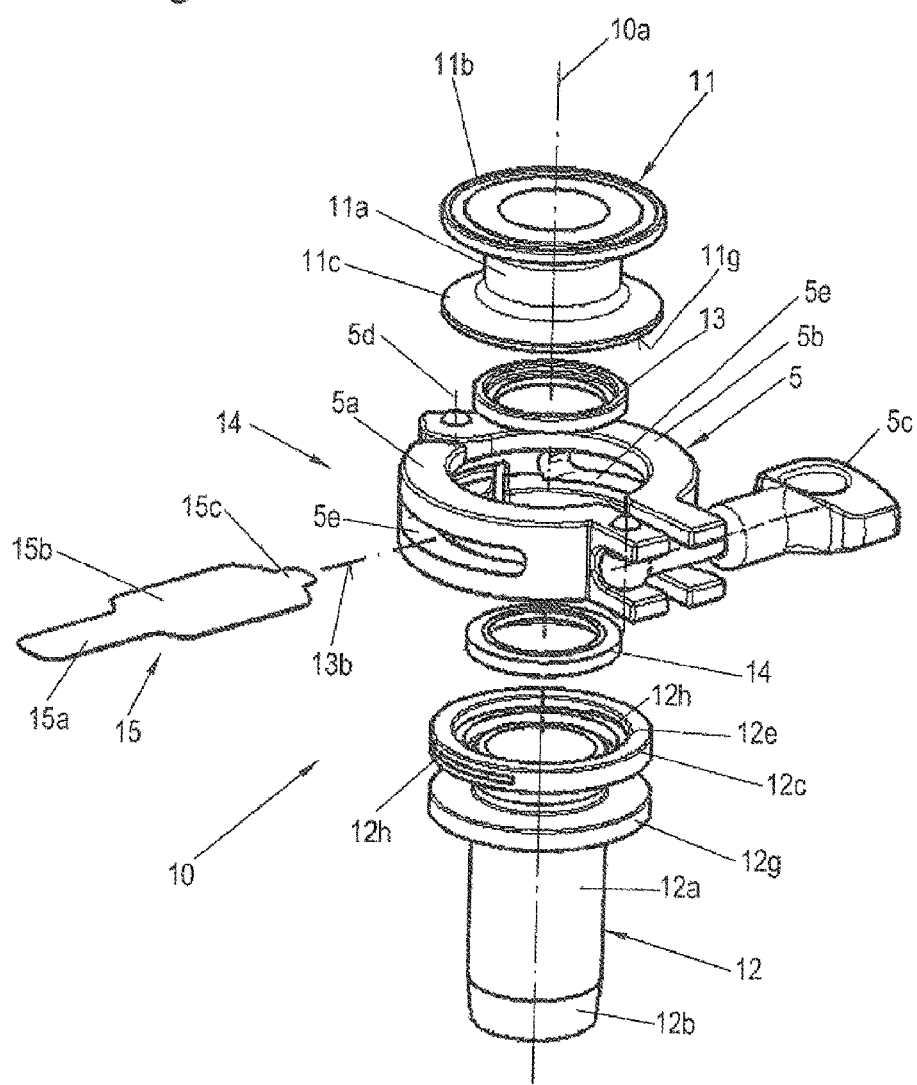

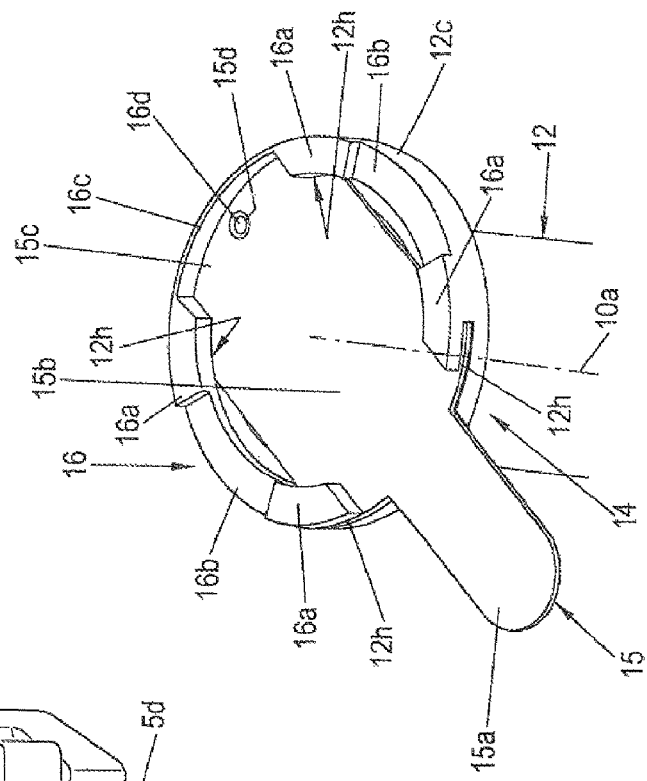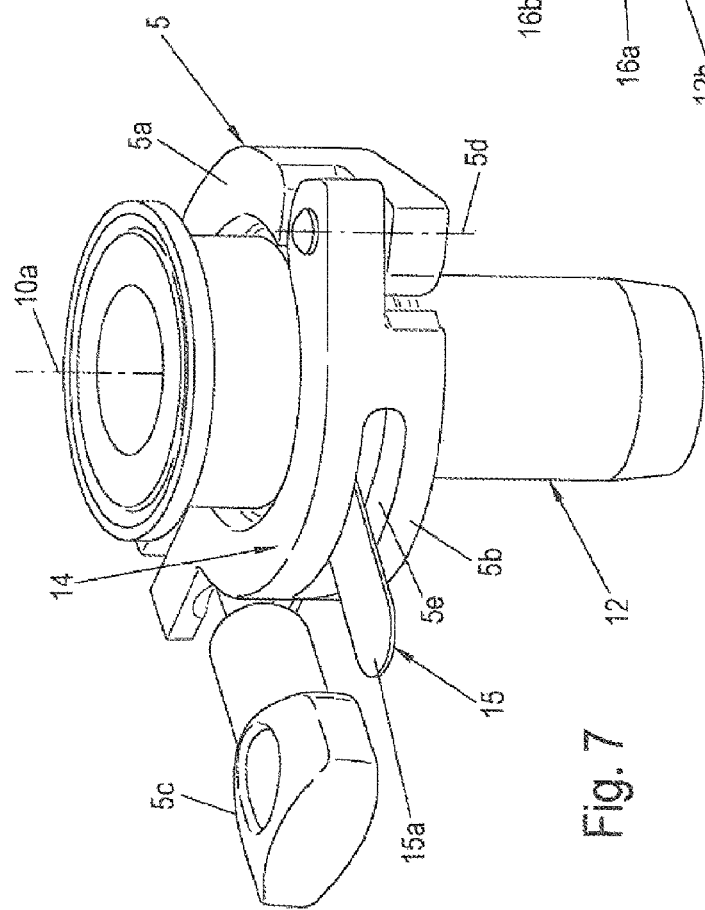

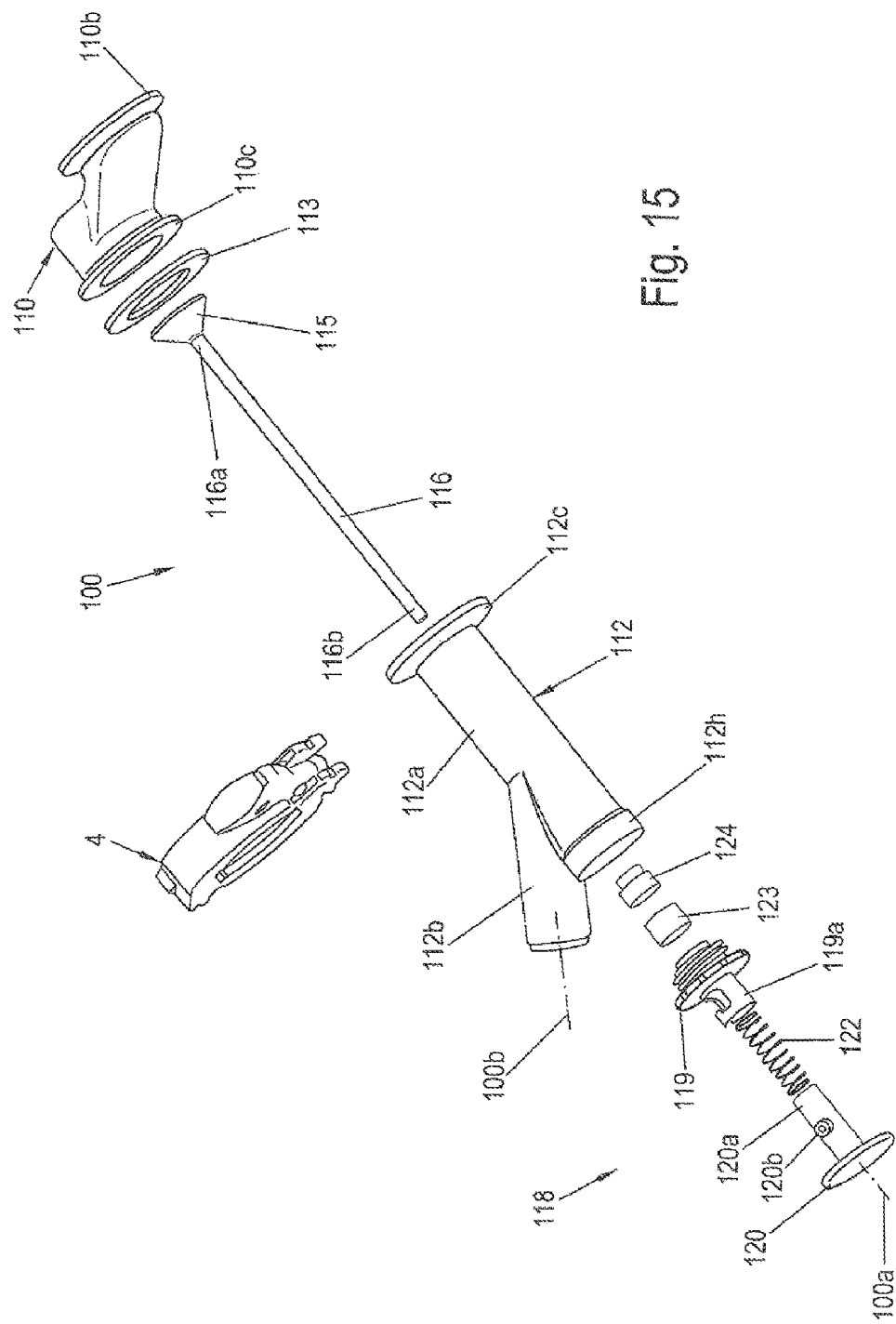

QUICK-COUPLING DEVICE

CROSS REFERENCE TO RELATED APPLICATIONS

This application is a national phase application under U.S.C. § 371 of PCT International Application No. PCT/EP2016/062569, filed Jun. 2, 2016, which claims priority to German Application No. 20 2015 003 900.6 filed Jun. 5, 2015, the disclosures of which are incorporated by reference herein.

FIELD AND BACKGROUND OF THE INVENTION

The invention relates to a quick-coupling device for a milking module in an automated dairy animal milking system.

Milking systems, as are used for example for the automatic milking of dairy animals, for example cows, sheep or goats, may be provided with such quick-coupling devices. An automatic milking process may be carried out by means of so-called milking robots. The quick-coupling devices serve to release a milking module from a milk pipe, for example in order to change it for the purpose of cleaning or replacement. The milk pipe may conduct so-called "good" or "bad" milk.

The document EP 0 671 875 B2 describes a milk pipe valve. A valve with a hose connection part is fastened in a valve guide on a milk pipe. When attaching or removing the connector, this valve is displaced such that it either closes or opens a cross section of the milk pipe. The valve always remains fixedly connected to the system. In this case, it is perceived as a drawback that a region of the valve is not able to be reliably cleaned. After the valve is closed, this region is located directly inside the milk pipe.

However, the relevant national regulations and guidelines which apply to pipes and equipment for milking systems and milking equipment which come into contact with milk, for example the American FDA guidelines, have to be observed and maintained.

Due to the continually increasing, and in particular different, national requirements, in particular relative to high throughput rates and continuous low-maintenance operation and/or operation with long maintenance intervals, there is a need for simple and reliable devices, i.e. also conforming to specific regulations.

SUMMARY OF THE INVENTION

In view of this background, the object of the invention is to provide an improved quick-coupling device.

A quick-coupling device is provided in which planned service times are not only correctly maintained but are also able to be reduced. A dismantling of the milking module is possible even during milking times, since the vacuum which is applied to the milk pipes does not have to be turned off. Switching off the system operation, therefore, is no longer required.

A quick-coupling device according to the invention for a milking module of a milking system for milking dairy animals forms a releasable and re-establishable connection between the milking module and a milk pipe and includes a valve mechanism which is able to be moved from a closed state into an open state and vice versa. The quick-coupling device includes a feeding port, a discharge port and two articulated clamps.

The construction including two articulated clamps is advantageously releasable and/or reconnectable in a simple and rapid manner. The articulated clamps may be configured, for example, for standardized flange connections, such as for example according to ISO 2852, and are thus commercially available in high quality and in a cost-effective manner.

In one embodiment, the feeding port at one end forms with an articulated clamp a releasable and re-establishable connection between the milking module and the feeding port, and the feeding port at its other end forms with the other of the articulated clamps, which is configured as a sliding clamp having at least one slot, a further releasable and re-establishable connection between the discharge port and the feeding port. The sliding clamp in its basic construction is an articulated clamp which has already been mentioned above and has the advantages described therein. It may be rapidly adapted by simple treatment in order to produce at least one slot.

In a further embodiment, it is provided that the feeding port at its other end comprises a sealing flange with a feeding seal, which forms the further releasable and re-establishable connection with a sealing flange with a discharge seal of the discharge port and the sliding clamp. Thus a simple releasable connection is provided.

The guidelines of the authorities, in particular the FDA, provide that when changing the milk module, i.e. when releasing the quick-coupling device, no additional external air and above all no contaminants are allowed to enter the interior of the milk pipes. Moreover, when cleaning the system, each region also has to be clean in the interior. No residual fluid should remain after the cleaning. The quick-coupling device, therefore, with the further releasable and re-establishable connection, is also advantageously self-draining since the feeding port is able to be removed in a simple manner.

In a further embodiment, the valve mechanism is arranged between the other end of the feeding port with the sliding clamp and the discharge port. This is advantageous since, when released, this particular region is easily accessible and easy to clean.

A further embodiment provides that the valve mechanism comprises the feeding seal, the discharge seal and a separate slide element. A separate slide element is particularly advantageous since it may be thoroughly cleaned and thus, in contrast to the prior art, no uncleaned areas are able to come into contact with the milk pipes. Additionally, the slide element has a planar shape which is advantageous, therefore, for cleaning and disinfection.

To this end, it is provided that the valve mechanism is in the open state when the separate slide element is removed and that the valve mechanism is in the closed state when the separate slide element is arranged between the feeding seal and the discharge seal. One advantage here is that, in the open position of the valve mechanism, it may not result in any deflection of a volumetric flow or in any alterations to the flow. The full internal cross section is maintained.

If, therefore, the volumetric flow and/or vacuum flow is to be interrupted for release by the quick-coupling device, the slide element is pushed between the feeding seal and the discharge seal, wherein the vacuum side is sealingly shut off by the slide element.

To this end, it is provided that in the closed position of the valve mechanism the separate slide element is received and held between the feeding seal and the discharge seal in a contact plane in which the feeding seal and the discharge seal are in contact with one another, at least in guide slots of the sealing flange of the discharge port.

In an alternative embodiment, the sealing flange of the discharge port comprises a slide guide in which the guide slots are integrally formed in segments and comprises a latching portion which in the closed state of the valve mechanism is in engagement with a latching opening of the inserted slide element. The sliding clamp may now be released. The milk module may be removed and, for example, replaced. After attaching the sliding clamp, the slide element may be pulled out again, whereby the valve mechanism is opened again. It is not necessary in this case to switch off the vacuum. This is advantageous since it saves time. It is not necessary for the entire installation to be switched off in order to be able to change an individual milking module during operation.

In one embodiment, the segments of the sealing flange of the discharge port protrude in the direction of its axis, wherein recesses are arranged between said segments in the direction of the axis, said recesses being countersunk relative thereto and forming with the segments a profile which, in the further connection which is produced, is in engagement with a profile corresponding thereto of an engagement portion of the lower face of the sealing flange of the feeding port in a positive and non-rotational manner. This provides an advantageously simple, rapid and accurate assembly.

It is advantageous if in the closed position of the valve mechanism the separate slide element extends through at least one slot of the sliding clamp. As a result, this permits a rapid insertion of the slide element with simultaneous usage of the usual advantages of an articulated clamp.

In one embodiment, in the closed position of the valve mechanism, in the further released connection and in the connection produced between the feeding port and the discharge port, the slide element forms a sealed connection with the discharge seal. The slide element, therefore, may advantageously remain for a sufficient length of time in its sealing position and/or shut-off position on the discharge port until the repaired and/or serviced or replaced milk module is inserted again.

In an alternative embodiment of the quick-coupling device, it is provided that the feeding port at one end forms with the one articulated clamp a releasable and re-establishable connection between the milking module and the feeding port, and in that the feeding port at its other end forms with the other articulated clamp a further releasable and re-establishable connection between the discharge port and the feeding port. The use of two conventional articulated clamps is advantageous since there is less variation in the components.

In this case, the feeding port at its other end comprises a sealing flange which forms the further releasable and re-establishable connection with a sealing flange of the discharge port, a seal arranged between these sealing flanges and the other articulated clamp. By the use of a seal the number of components is reduced.

It is further provided that the valve mechanism is arranged between the other end of the feeding port with the other articulated clamp and the discharge port. The valve mechanism is thus advantageously accessible and able to be cleaned in a simple and rapid manner.

In a further embodiment, the valve mechanism comprises a valve body, a valve rod, a valve seat in the sealing flange of the discharge port and an actuating device. The valve mechanism is advantageously able to be actuated by the actuating device from outside. A particular advantage here is that after releasing and removing the feeding port, a smooth released surface is present, wherein the valve body is freely accessible from its upper face and may be cleaned and disinfected in a simple manner. Additionally, the valve body is drawn into the valve seat by the vacuum which is still present in the discharge port, whereby a seal is reinforced.

In a further embodiment, the valve body is fixedly connected to an upper rod end of the valve rod, wherein a sealing surface of the valve body corresponds to the valve seat in the sealing flange of the discharge port, wherein in the closed position of the valve mechanism the valve body closes the valve seat with its sealing surface, and wherein in the open position of the valve mechanism the sealing surface of the valve body is spaced apart from the valve seat.

In a further embodiment, the valve rod extends through a connecting line of the body of the discharge port into a bearing portion of the discharge port and through said bearing portion into the actuating device, wherein a lower rod end of the valve rod is fixedly connected to an actuating element of the actuating device. This produces an advantageously compact construction.

It is provided in a further embodiment that the valve rod in the bearing portion of the discharge port is longitudinally displaceably guided in a bushing and is sealed by a seal relative to the connecting line of the body of the discharge port. A simple construction is permitted thereby.

A further embodiment provides that the actuating device comprises a bearing flange with a sleeve portion, the actuating element, a slotted guide and an energy storage element. In this manner, a correct adjustment of the states of the valve mechanism may be undertaken in a simple manner from outside.

In a further embodiment, the slotted guide is integrally formed in the wall of the sleeve portion and, with a guide element connected to the actuating element, forms a so-called mechanical RS-flip flop with two stable states, namely with the valve mechanism closed and with the valve mechanism open. Thus advantageously the position of the valve mechanism is able to be identified easily from outside.

In a further embodiment, at least one portion of the feeding port and at least one portion of the discharge port, which is releasable therefrom and reconnectable thereto, are arranged centered relative to one another. This produces the advantage of a simple seal.

BRIEF DESCRIPTION OF THE DRAWINGS

Further advantages and details are disclosed from the exemplary embodiment shown in the figures of the drawings, in which:

FIG. 6 shows a schematic exploded view of the first exemplary embodiment according to FIG. 2;

FIG. 7 shows a schematic perspective view of the first exemplary embodiment according to FIGS. 4-5 in the closed connected position from a different viewpoint;

FIG. 8 shows a schematic perspective view of a variant of the first exemplary embodiment according to FIG. 7 in a closed released position;

FIG. 15 shows a schematic exploded view of the second exemplary embodiment according to FIG. 10.

DETAILED DESCRIPTION OF THE DRAWINGS

The terms "above", "below", "left" and "right" refer to the respective arrangement in the figures. An installed position, for example on the top, at the side or in a different position, is not limited thereto.

Figure 1:
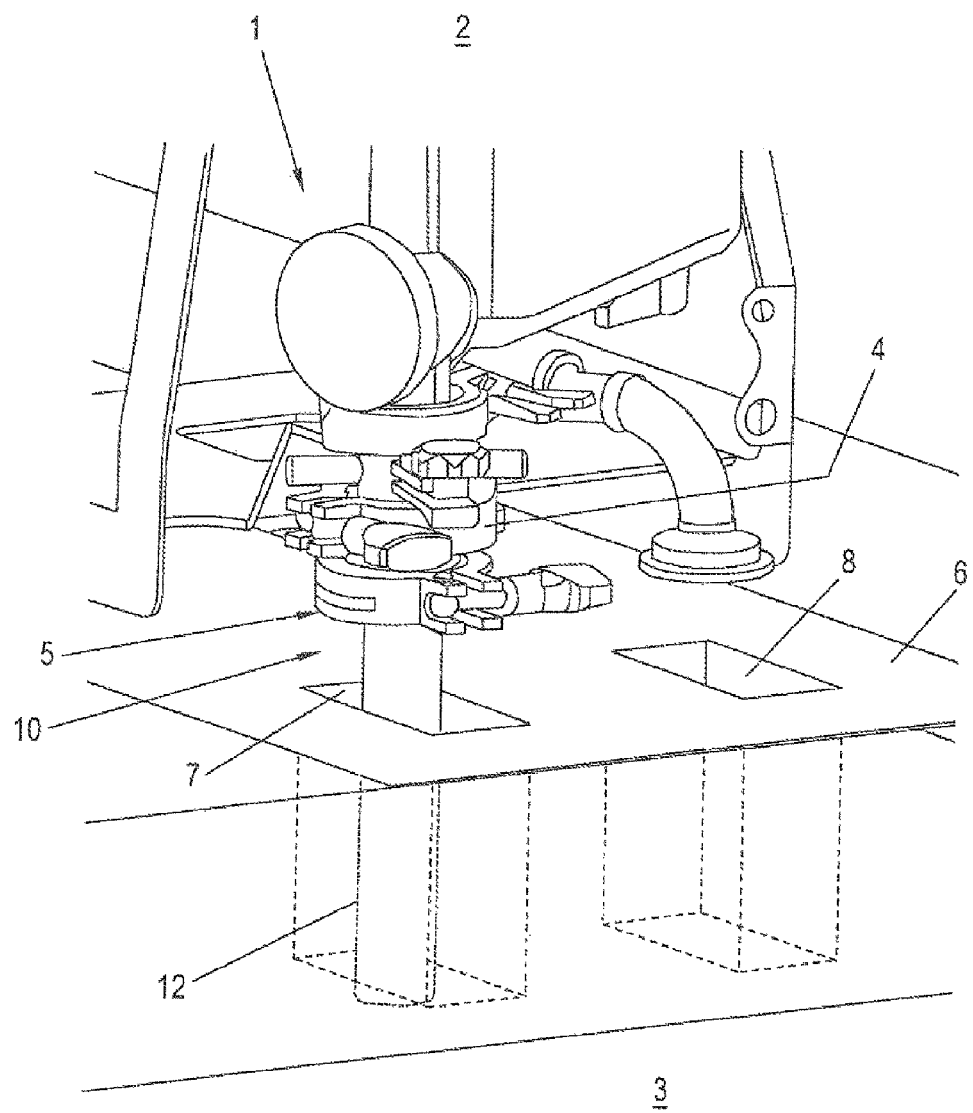
FIG. 1 shows a schematic perspective view of an exemplary application of a first exemplary embodiment of a quick-coupling device according to the invention.
Figure 2:
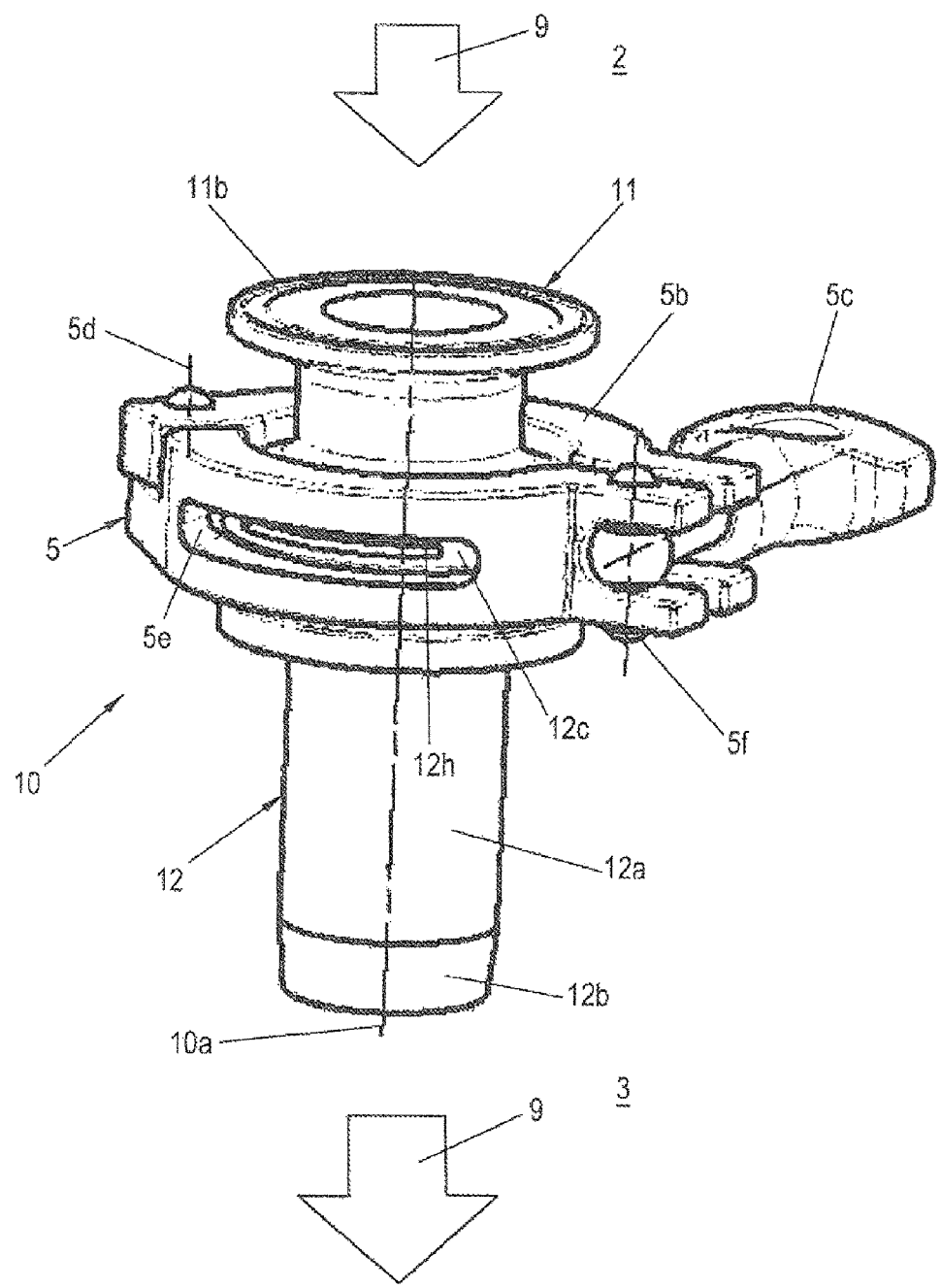
FIG. 2 shows a schematic perspective view of the first exemplary embodiment according to FIG. 1 in an open connected position.
Figure 3:
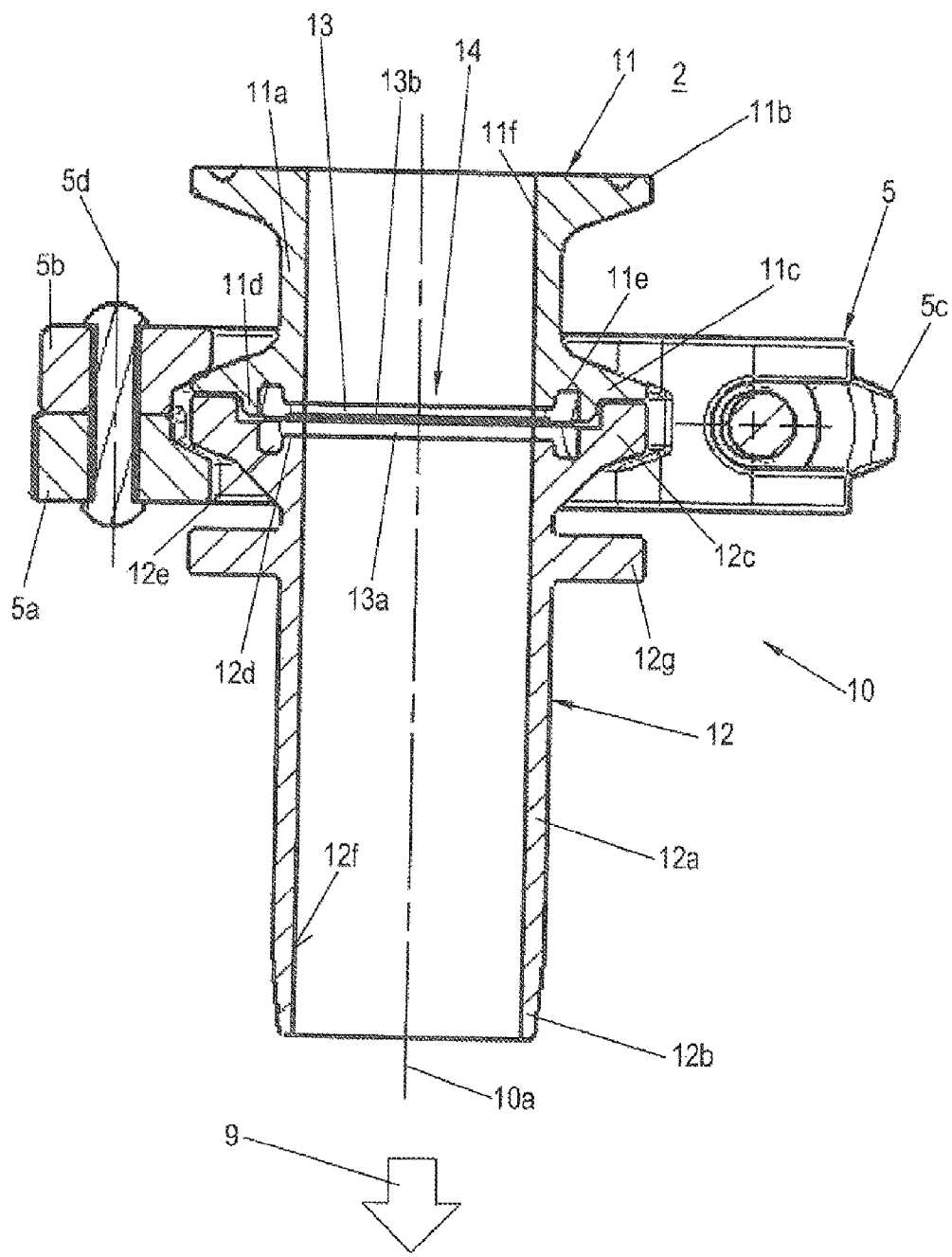
FIG. 3 shows a schematic longitudinal sectional view of the first exemplary embodiment according to FIG. 2 in the open connected position.

FIG. 1 shows a schematic perspective view of an application by way of example of a first exemplary embodiment of a quick-coupling device 10 according to the invention. In FIG. 2 a schematic perspective view of the first exemplary embodiment according to FIG. 1 is shown in an open connected position and FIG. 3 shows a schematic longitudinal sectional view of the first exemplary embodiment according to FIG. 2 in the open connected position.

In FIG. 1 a detail of a milking parlor is shown, in which a dairy animal is milked by means of a milking system. The construction and mode of operation of such a milking parlor may be derived from, for example, WO 2013/135842 A1 and are not described further here. The milk which has been milked is conducted from a milking module 1, not described here in more detail, by the action of a produced vacuum into a milk pipe, not shown but easy to imagine.

The quick-coupling device 10 is arranged between the milking module 1 on a milking system side 2 and the milk pipe on a vacuum side 3 and conducts a vacuum flow, with the milk which has been milked, from the milking module 1 into the milk pipe on the vacuum side 3.

The quick-coupling device 10 forms a releasable and re-establishable connection between the milking module 1 and the milk pipe and permits the milking module 1 to be replaced during operation, i.e. when the vacuum is applied to the milk pipe(s).

In the example shown, two quick-coupling devices 10 are provided, only one thereof being shown here for the sake of clarity. Each quick-coupling connection 10 comprises a feeding port 11, a discharge port 12, an articulated clamp 4 and a sliding clamp 5. The feeding port 11 and the discharge port 12 are located centered relative to one another in a vacuum flow 9. The associated components are described in further detail below.

The milking module 1 is arranged in a dismantlable manner on the milking system side 2, for example on a holder on a base plate 6. Two through-passages, each for one discharge port 12 of one respective quick-coupling device 10, are incorporated in the base plate 6.

On the milking system side 2, the quick-coupling device 10 is connected via the feeding port 11 to the milking module 1. To this end, two releasable connections are provided here, namely a first releasable connection between the milking module 1 and a first upper end of the feeding port 11 and a second releasable connection between a second lower end of the feeding port 11 and an upper end of the discharge port 12. The first releasable connection comprises the articulated clamp 4. The sliding clamp 5 is assigned to the second connection.

The articulated clamp 4 is, for example, a commercially available articulated clamp for a flange connection according to the Standard ISO 2852. The sliding clamp 5 also has such an articulated clamp as a basis, wherein the sliding clamp 5 is provided with further features which are described in more detail below.

According to specific relevant standards, for example, guidelines of an authority (in particular the FDA in the USA) provide that when replacing the milking module 1, i.e. when releasing the quick-coupling device 10, no additional external air and above all no contaminants are allowed to enter the interior of the milk pipes. To this end, the quick-coupling device 10 is equipped with a valve mechanism 14 between the feeding port 11 and the discharge port 12, said valve mechanism being able to be moved from an open position into a closed position and vice versa. The valve mechanism 14 is described below in further detail.

The quick-coupling device 10 has three different positions. In an open connected position the valve mechanism 14 is opened and the milk module 1 is connected via the quick-coupling device 10 to the milk pipe. This is the case if the vacuum flow 9 is conducted from the milking module 1 into the milk pipe.

If the valve mechanism 14 is closed and the milking module 1 is reconnected via the quick-coupling device to the milk pipe, a closed connected position is adopted. This position is reached by closing the valve mechanism 14. At the same time, the vacuum flow 9 is interrupted. The discharge port 12 is also subjected to the vacuum, wherein the vacuum is absent from the feeding port 11 in this position.

Subsequently, the articulated clamp 4 and the sliding clamp 5 may be released and removed, after which the milking module 1 may be removed without a vacuum being present. This position is denoted as the closed released position.

The removed milking module 1 may be inserted again after repair, cleaning or replacement in the closed released position. After attaching the articulated clamp 4 and the sliding clamp 5, the connections are produced again and the closed connected position is adopted again. For restarting the operation, the open connected position is now produced by opening the valve mechanism 14.

During this replacement process of the milking module 1 it is not necessary for the vacuum to be switched off, whereby time is saved.

The quick-coupling device 10 comprises in the first exemplary embodiment the feeding port 11, the discharge port 12, the articulated clamp 4 and the sliding clamp 5 and also the valve mechanism 14.

The feeding port 11 has a tubular body 11a with a circular cross section and an internal chamber 11f. At an upper end the body 11a is provided with a connecting flange 11b and at a lower end with a sealing flange 11c. The connecting flange 11b and the sealing flange 11c are configured according to ISO 2852. Additionally, the sealing flange 11c on its lower face has a centering portion 11d and a receiver 11e for a feeding seal 13. The lower face of the sealing flange 11c may also additionally comprise engagement portions 11g which are described in more detail below.

The discharge port 12 comprises a tubular body 12a with a circular cross section and an internal chamber 12f, wherein an internal diameter of the internal chamber 12f is equal to an internal diameter of the internal chamber 11f of the feeding port 11. A sealing flange 12c according to ISO 2852 is integrally formed at an upper end of the body 12a. The sealing flange 12c on its upper face is provided with a centering portion 12d which corresponds to the centering portion 11d of the feeding port 11. Moreover, a receiver 12e for a discharge seal 13a is integrally formed in the sealing flange 12c from the upper face thereof.

A peripheral collar 12g is arranged below the sealing flange 12c of the discharge port 12.

The lower end of the body 12a is provided with a connecting end 12b which is conical in this case and which forms a connection with the milk pipe, not shown.

The feeding port 11 and the discharge port 12 are centered via their centering portions 11d, 12d, such that they are arranged coaxially to a common axis 10a.

The feeding seal 13 is inserted in the receiver 11e of the feeding port 11. Similarly, the receiver 12e of the discharge port 12 is provided with the discharge seal 13a. In the open connected position which, for example, is shown in FIG. 3, the feeding seal 13 and the discharge seal 13a are in contact with one another, wherein their internal diameters correspond to the internal diameters of the internal chambers 11f, 12f of the feeding port 11 and discharge port 12. Thus a line of the vacuum flow 9 is ensured from the feeding port 11 into the discharge port 12.

The sealing flange 12c of the discharge port 12 is provided in this case with two opposing guide slots 12h which are located in a common plane. The common plane of the guide slots 12h extends at right angles to the axis 10a and is located in a contact plane 13b in which the feeding seal 13 and the discharge seal 13a are in contact with one another.

The feeding seal 13 and the discharge seal 13a may be configured, for example, as flat seals.

The sealing flange 11c of the feeding port 11 and the sealing flange 12c of the discharge port 12 are surrounded in a peripheral manner by the sliding clamp and are sealingly compressed thereby when it is tensioned as may be identified in FIGS. 2 and 3 via their conical external profile according to ISO 2852. In this case, the seals 13 and 13a which are in contact are sealingly pressed against one another such that a sealed connection is formed between the feeding port 11 and the discharge port 12.

The feeding seal 13 and the discharge seal 13a are components of the valve mechanism 14 which additionally comprises a slide element 15 which is explained in further detail below. In the open connected position, shown in FIGS. 2 and 3, of the quick-coupling device 10 the slide element 15 is removed.

The sliding clamp 5 comprises two clamping clips 5a, 5b which are pivotably connected together by one respective end in an axis of articulation 5d. The other opposing ends are of fork-shaped configuration and are provided with a screwable clamping element 5c which is pivotably attached by a pin 5f to the fork-shaped end of the one clamping clip 5a. This basic construction also forms the basis of the articulated clamp 4 of the same construction. The articulated clamp 4 and the basic construction of the sliding clamp 5 may, for example, be conventional articulated clamps for a flange connection according to ISO 2852.

The sliding clamp 5 is provided with one respective slot 5e, in contrast to the above-described basic construction of a conventional articulated clamp. Each clamping clip 5a, 5b has this slot 5e which extends in the peripheral direction of each clamping clip 5a, 5b centrally over approximately two thirds of a periphery and has the shape of an elongated hole in a projection plane.

The sliding clamp 5 is arranged on the sealing flanges 11c, 12c, such that at least one slot 5e opposes a guide slot 12h of the sealing flange 12c of the discharge port 12.

Figure 4:
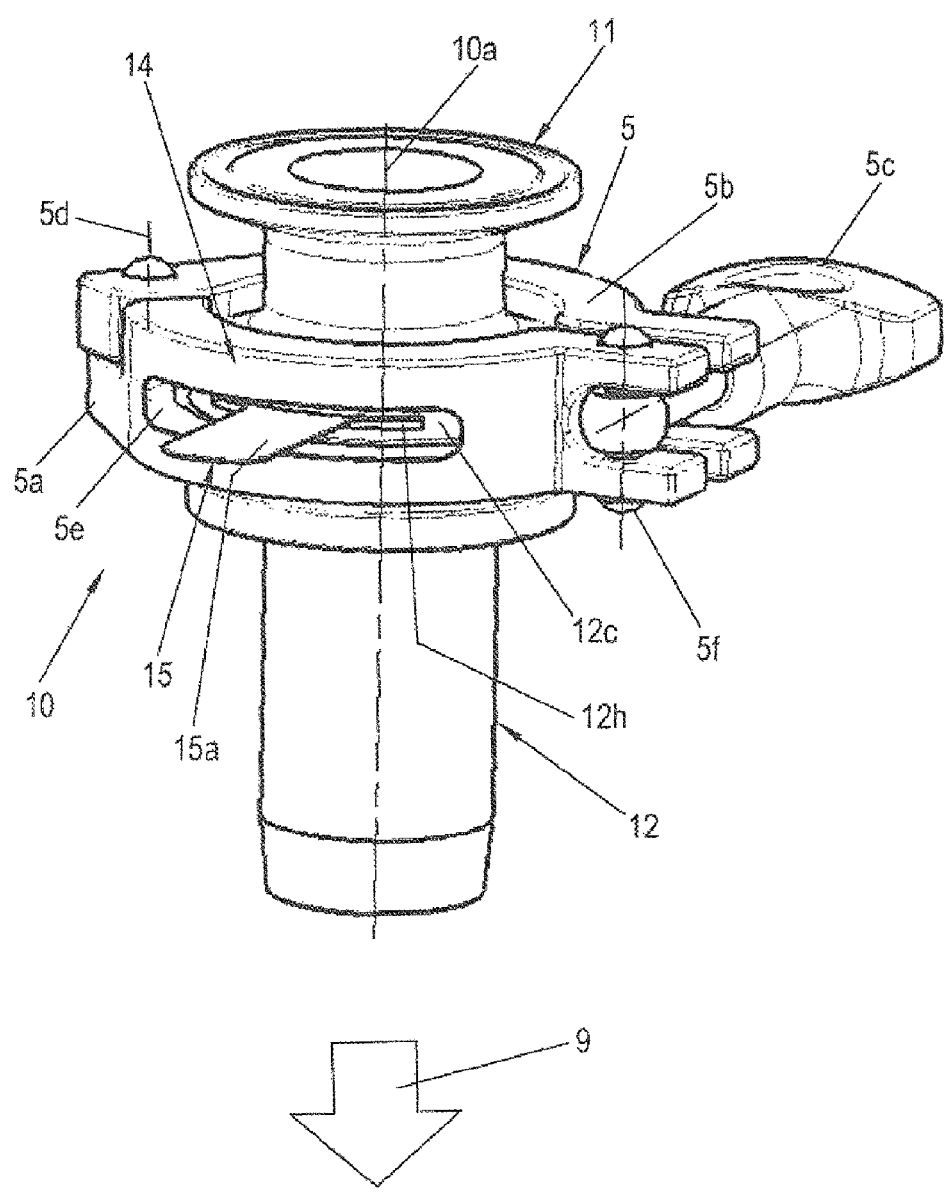
FIGS. 4-5 show schematic views of the first exemplary embodiment according to FIG. 2 in a closed connected position.
Figure 5:
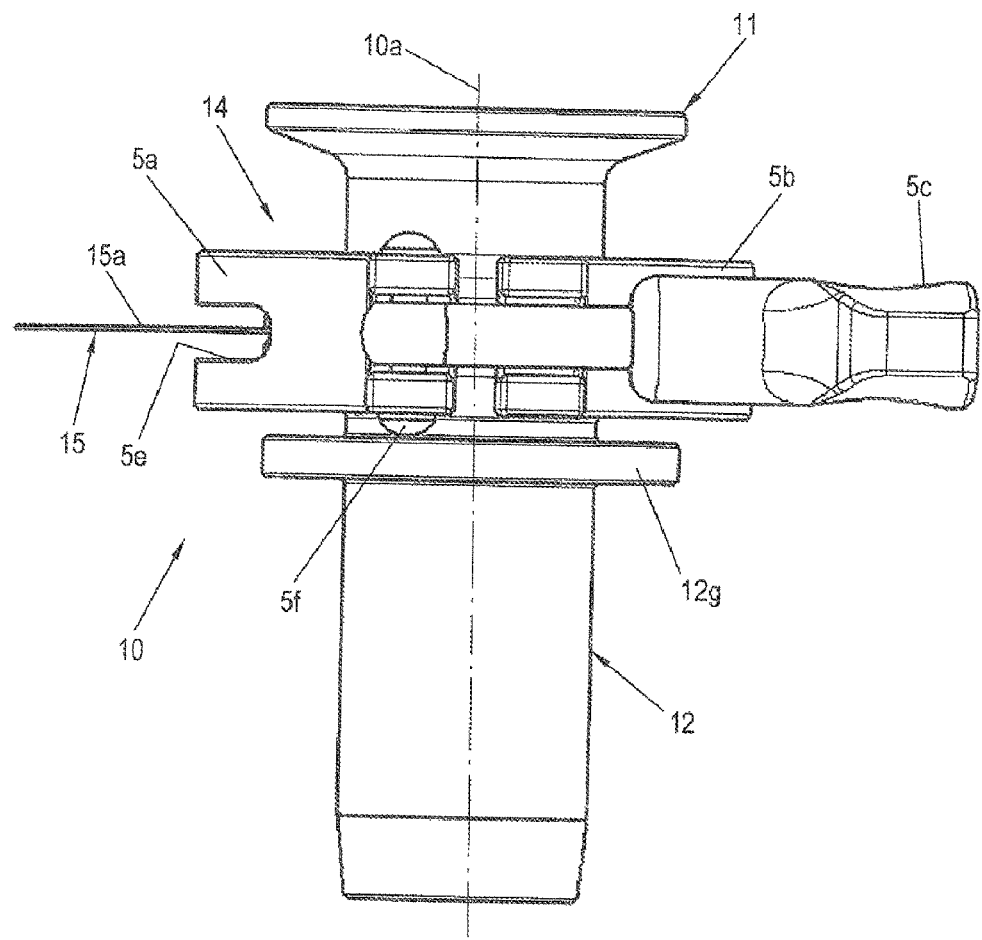

FIG. 4 shows a schematic perspective view of the first exemplary embodiment according to FIG. 2 in the closed connected position. FIG. 5 shows a side view thereof and FIG. 6 shows a schematic exploded view of the first exemplary embodiment according to FIG. 2.

In the closed connected position of the quick-coupling device 10, the slide element 15 of the valve mechanism is inserted between the feeding seal 13 and the discharge seal 13a in the common plane of the guide slot 12h and the contact plane 13b of the feeding seal 13 and the discharge seal 13a. This is permitted by the slots 5e of the sliding clamp 5 and the guide slots 12h of the sealing flange 12c of the discharge port 12.

The slide element 15 comprises an actuating portion 15a, a sealing portion 15b and an end portion 15c. The actuating portion 15a serves for manual handling, for inserting the slide element 15 through one of the slots 5e of the sliding clamp 5 into the contact plane 13b of the seals 13 and 13a. In the inserted position of the slide element 15 in the contact plane 13b the sealing portion 15b fully closes the internal through-openings of the feeding seal 13 and the discharge seal 13a, such that the vacuum flow 9 is interrupted, wherein the internal chamber 12f of the discharge port 12 still remains subjected to the vacuum.

The guide slots 12h of the sealing flange 12c of the discharge port 12 form a guide for the slide element 15.

In the inserted position of the slide element 15 the end portion 15c of the slide element 15 is located in the opposing guide slot 12h. To this end, the opposing guide slot 12h may be designed to be shorter in its peripheral length, whereby a stop for the sealing portion 15b may be formed.

The actuating portion 15a of the slide element 15 protrudes radially outwardly from the slot 5e. Thus the slide element 15 is able to be rapidly and easily grasped and handled.

The slide element 15 is produced, for example, from a metal material which is able to be easily cleaned and disinfected. For example, it may be produced from a stainless steel sheet as a stamped part, wherein the stainless steel for the application has to be approved in accordance with standards and/or guidelines.

In FIG. 5 it is shown that the peripheral collar 12g of the discharge port 12 forms a support for the pin 5f and that of the axis of articulation 5d of the sliding clamp 5. Thus a horizontal positioning of the sliding clamp 5 is permitted, whereby the slide element 15 may be inserted through the slots 5e without being jammed.

FIG. 7 shows a schematic perspective view of the first exemplary embodiment according to FIGS. 4-5 in the closed connected position from a different viewpoint. In this case, the slot 5e of the other clamping clip 5b is shown. Thus it is possible to insert the slide element 15 from two sides into the valve mechanism 14 for closing said valve mechanism.

FIG. 8 shows a schematic perspective view of a variant of the first exemplary embodiment according to FIG. 7 in a closed released position.

In this variant, the upper face of the sealing flange 12c of the discharge port 12 comprises a slide guide 16 in which the guide slots 12h are integrally formed in segments 16a. In this case, four segments 16a are arranged at regular intervals on the periphery of the upper face of the sealing flange 12c. Two segments 16a form with one respective guide slot 12h an insertion portion for the slide element 15. On the periphery, in each case a recess 16b adjoins each of these "corner" segments 16a on the insertion portion, the respective upper face thereof being located lower in the direction of the axis 10a than the upper faces of the segments 16a. The surfaces of the upper faces of the recesses 16b are located approximately at the same height as the upper face of the inserted slide element 15.

On the periphery in each case a further "corner" segment 16a adjoins each of the recesses 16b, said "corner" segments also in each case comprising a guide slot 12h for the rear rounded corners of the sealing portion 15b, said corners being received in said guide slot. The rear "corner" segments 16a are connected together by a circular segment-shaped wall 16c which at the same time forms a stop for a rounded edge of the end portion 15c of the slide element 15. A radius of the rounded corners of the sealing portion 15b and the rounded edge of the end portion 15c of the slide element 15 corresponds to an internal radius of the wall 16c. Moreover, the end portion 16d is centrally provided with a latching opening 15d which in the inserted position of the slide element 15 is in engagement with a latching portion 16d, for example a raised portion of the sealing flange 12c of the discharge port 12.

The segments 16a protruding upwardly in the direction of the axis 10a and the recesses 16b countersunk downwardly in the direction of the axis 10a in the closed connected position and in the open connected position are in engagement with a profile corresponding thereto (not shown but able to be easily imagined) of an engagement portion 11g of the lower face of the sealing flange 12c of the feeding port 11, positively and thus non-rotatably relative to one another.

Figure 9:
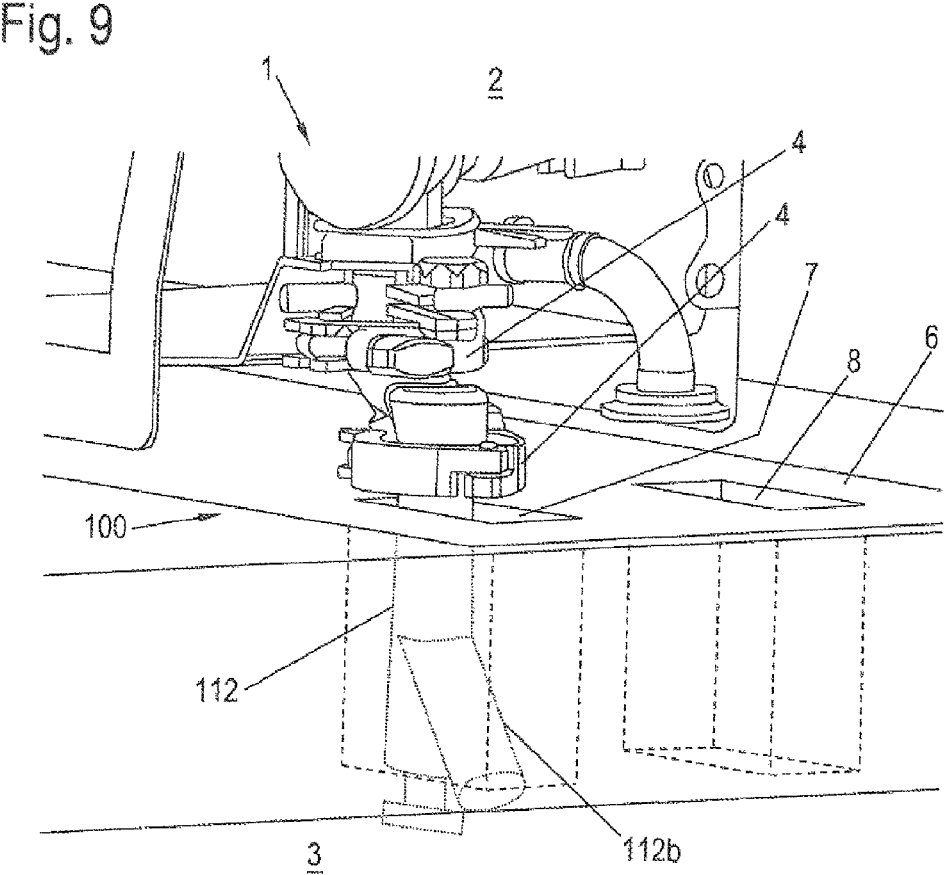
FIGS. 9-9a show a schematic perspective view of an application by way of example of a second exemplary embodiment of the quick-coupling device according to the invention.
Figure 9A:
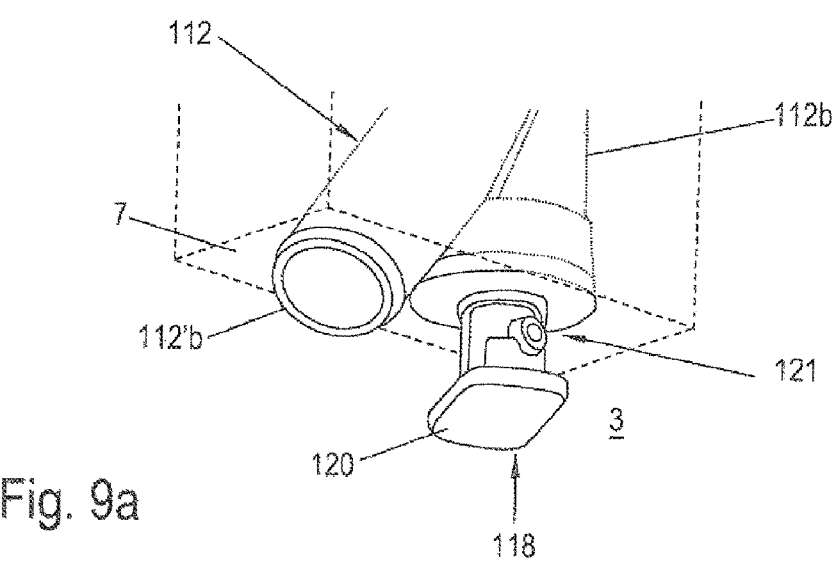
Figure 10:
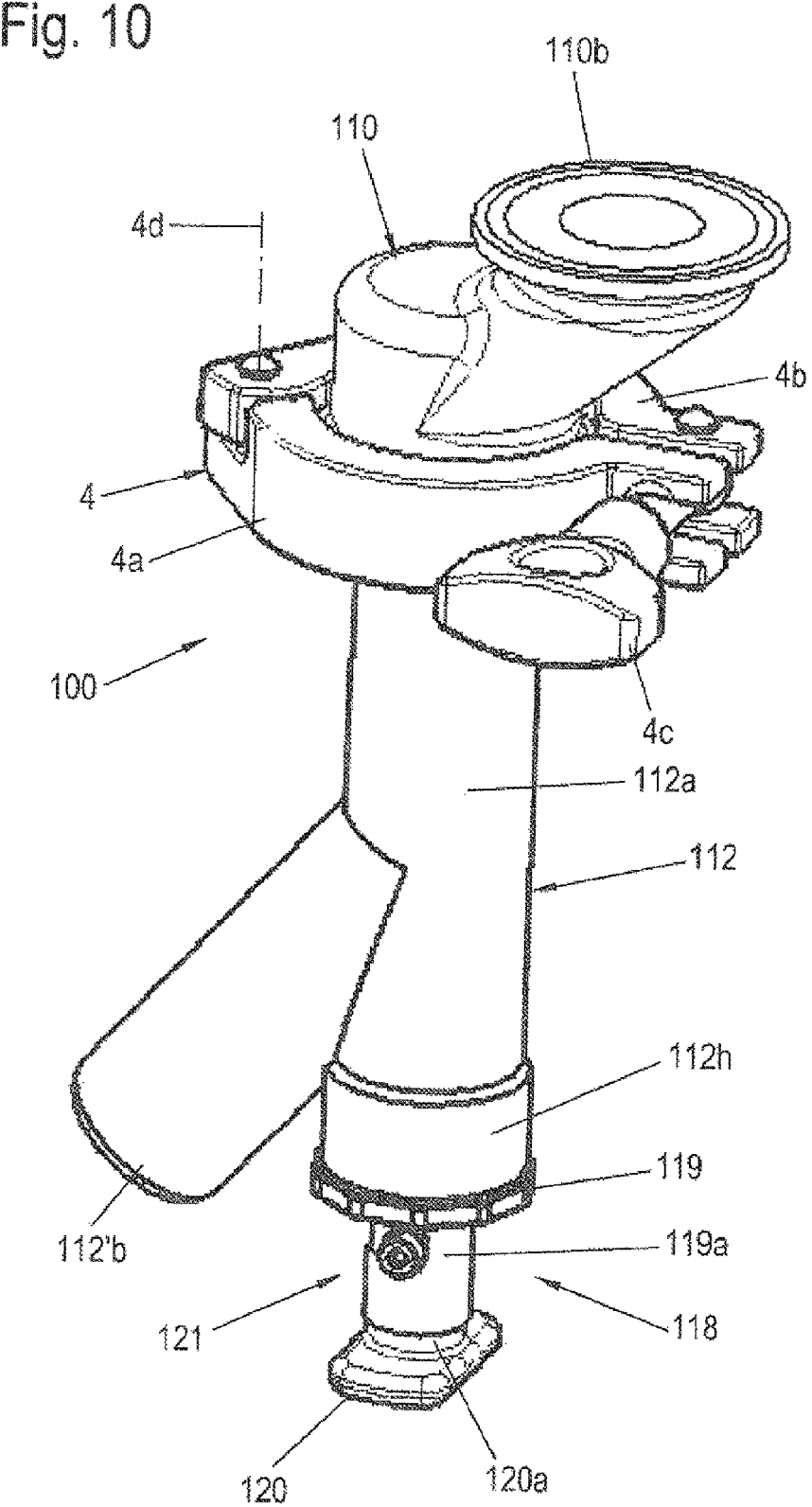
FIG. 10 shows a schematic perspective view of the second exemplary embodiment according to FIG. 9 in an open connected position.
Figure 11:
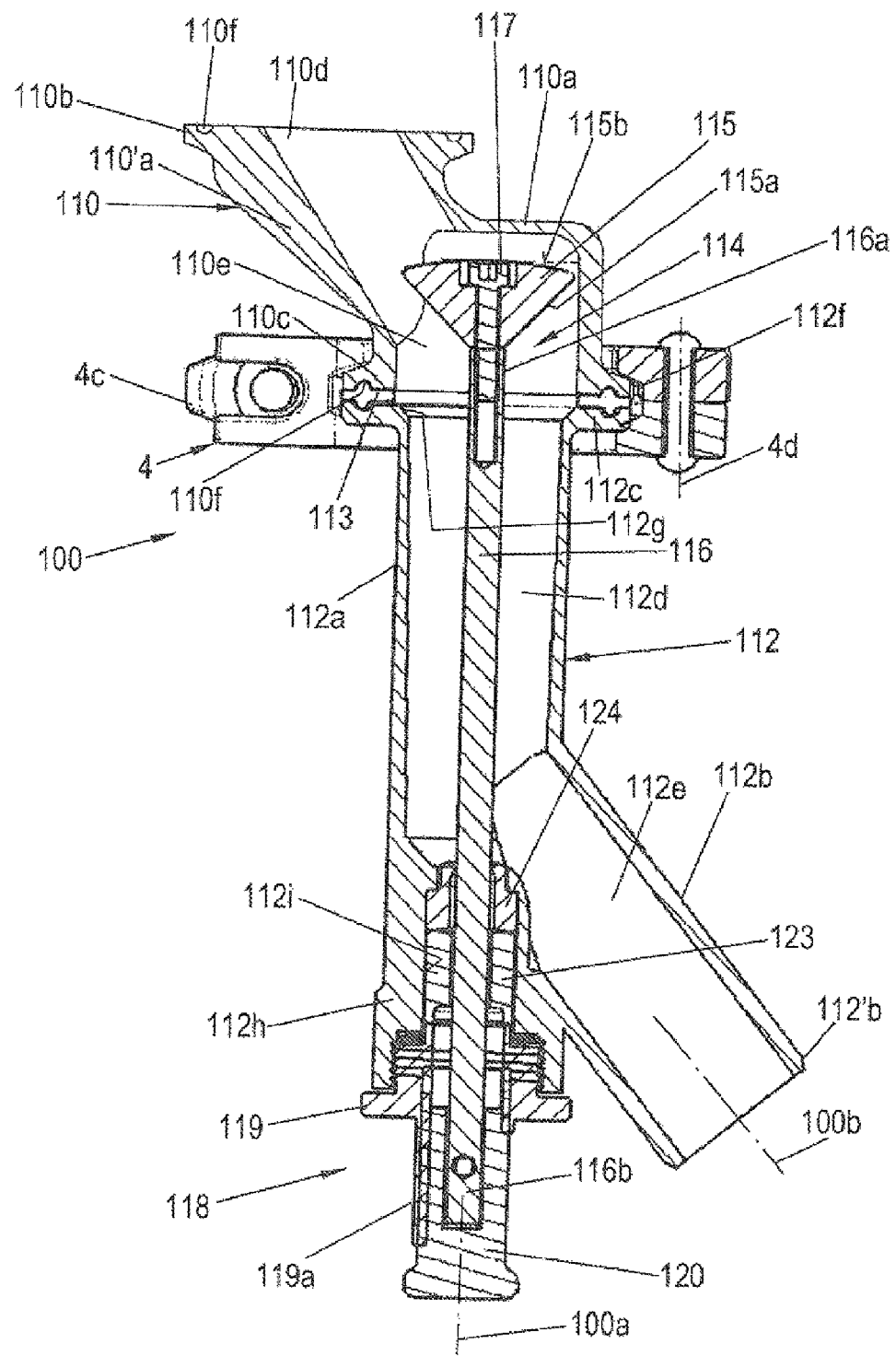
FIG. 11 shows a schematic longitudinal sectional view of the second exemplary embodiment according to FIG. 10 in the open connected position.
Figure 12:
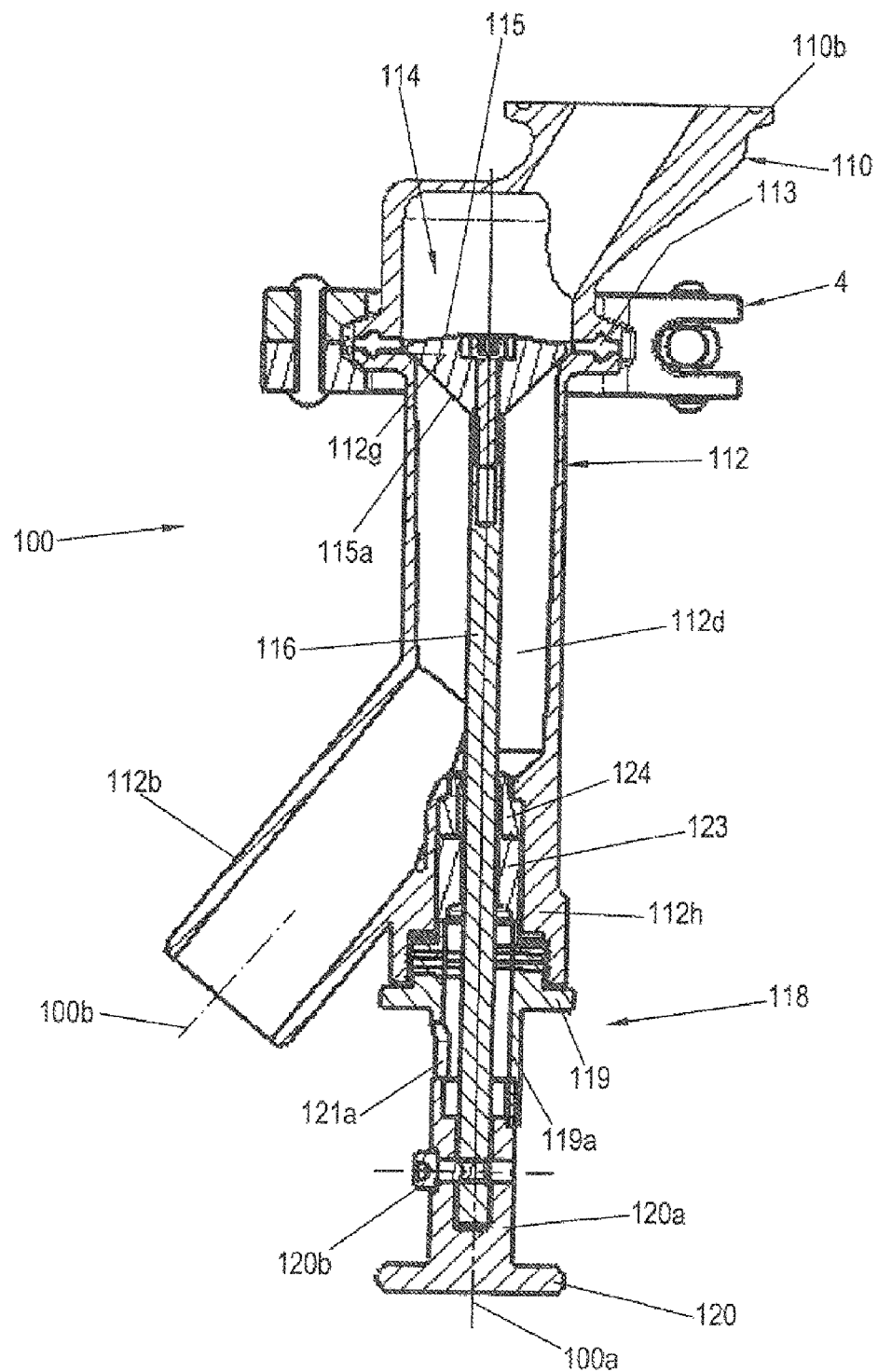
FIG. 12 shows a schematic longitudinal sectional view of the second exemplary embodiment according to FIG. 10 in the closed connected position.
Figure 13:
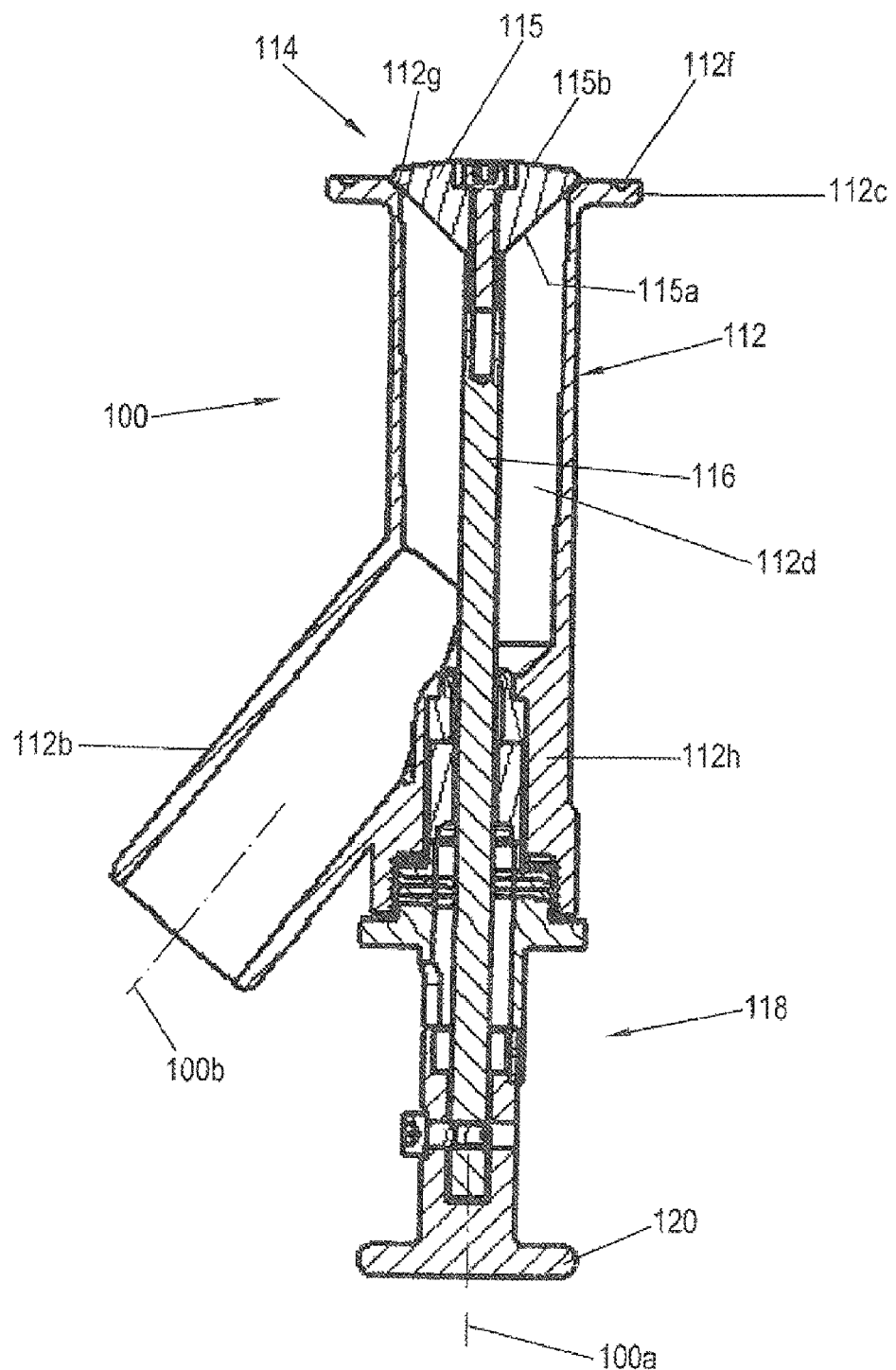
FIG. 13 shows a schematic longitudinal sectional view of the second exemplary embodiment according to FIG. 12 in a closed released position.

FIG. 9 shows a schematic perspective view of an exemplary application of a second exemplary embodiment of a quick-coupling device 100 according to the invention. In FIG. 9a an enlarged portion of the lower face of the quick-coupling device 100 is shown. FIG. 10 shows a schematic perspective view of the second exemplary embodiment according to FIG. 9 in an open connected position, wherein to this end FIG. 11 shows a schematic longitudinal sectional view of the second exemplary embodiment according to FIG. 10 in the open connected position. FIG. 12 is a schematic longitudinal sectional view of the second exemplary embodiment according to FIG. 10 in the closed connected position. In FIG. 13 a schematic longitudinal sectional view of the second exemplary embodiment according to FIG. 12 is shown in a closed released position.

The second exemplary embodiment of the quick-coupling device 100 differs from the first exemplary embodiment of the quick-coupling device 10 by the design of the feeding port 110 and the discharge port 120 and by the construction of the valve mechanism 114. Additionally, in the second exemplary embodiment two equal articulated clamps 4 are present.

Moreover, the quick-coupling device 100 forms a releasable and re-establishable connection between the milking module 1 and the milk pipe and permits the milking module 1 to be replaced during operation, i.e. when the vacuum is applied to the milk pipe(s).

Also in this example, two quick-coupling devices 100 are provided. Each quick-coupling connection 100 comprises a feeding port 110, a discharge port 120, two equal articulated clamps 4 and a valve mechanism 114 with an actuating device 118.

The actuating device 118 for moving the valve mechanism 114 is able to be accessed and operated from below, beneath the base plate 6 in the region of the connection of the discharge port 112. It is described below in more detail.

The construction of the application is already described in detail above in connection with FIG. 1 and is not repeated here.

The valve mechanism 114 is located between the feeding port 110 and the discharge port 120 and is able to be moved from an open position into a closed position and vice versa. The valve mechanism 114 is described below in more detail.

Moreover, the quick-coupling device 100 has the three different positions already described above.

The feeding port 11 has a hood-shaped body 110a with a feeding body 110'a integrally formed thereon in an oblique manner. The hood-shaped body 110a forms a type of valve housing with its internal chamber as a valve chamber 110e. An internal chamber of the feeding body 110'a communicates with the valve chamber 110e. An upper end of the feeding body 110'a of the feeding port 110 is provided with a connecting flange 110b which is configured according to ISO 2852 and on its upper face comprises a groove 110f for a seal, not shown. The upper end of the feeding body 110'a is able to be connected to the milking module 1 via one of the two equal articulated clamps 4 (FIG. 9).

At the lower end of the body 110a of the feeding port 110 a sealing flange 110c (also configured according to ISO 2852) is integrally formed and is provided with a peripheral groove 110f in its front face which faces downwardly.

The discharge port 12 comprises a tubular body 112a with a circular cross section and an internal chamber as a connecting line 112d. Approximately in the lower third of the discharge port 112 a bearing portion 112h with the actuating device 118 coaxially adjoins the body 112a, which is explained below in more detail.

A tubular discharge body 112b with a circular cross section and an internal chamber as the discharge line 112e facing obliquely downward is integrally formed in the region of the transition of the body 112a into the bearing portion 118. The discharge line 112e communicates with the connecting line 112d of the body 112a.

The lower end of the discharge body 112b is provided with a connecting end 112'b which is conical in this case and which forms a connection to the milk pipe, not shown here.

An upper end of the body 112a of the discharge port 112 is provided with a sealing flange 112c according to ISO 2852 which also comprises a peripheral groove 112f which is integrally formed in its upper face and which in the assembled state, in the closed and open connected position, opposes the groove 110f of the sealing flange 110c of the feeding port 110 and thereby receives a seal 113. The sealing flanges 110c and 112c are able to be connected to the other articulated clamp 4 of the two articulated clamps 4.

An internal diameter of the valve chamber 110e of the feeding port 110 is larger than an internal diameter of the connecting line 112d of the discharge port 12. A conical valve seat 112g inside the sealing flange 112c of the discharge port 112 forms a transition from the valve chamber 110e of the feeding port 110 into the connecting line 112d of the discharge port 112.

The valve chamber 110e of the feeding port 110 and the body 112a of the discharge port 120 are centered such that they are arranged coaxially to a common axis 100a.

The sealing flange 110c of the feeding port 110 and the sealing flange 112c of the discharge port 112 are surrounded in a peripheral manner by the other articulated clamp 4 and are sealingly compressed thereby when it is tensioned, as may be identified in FIGS. 10 to 12, via their conical external profiles according to ISO 2852. In this case, the seal 113 forms a sealed connection between the feeding port 110 and the discharge port 112.

The other articulated clamp 4 comprises two clamping clips 4a, 4b which are pivotably connected together by one respective end in an axis of articulation 4d. The other opposing ends are of fork-shaped configuration and are provided with a screwable clamping element 4c, which is pivotably attached by a pin to the fork-shaped end of the clamping clip 4b. The other articulated clamp 4 may, for example, be a conventional articulated clamp for a flange connection according to ISO 2852.

The valve mechanism 114 comprises a valve body 115, a valve rod 116, the valve seat 112g and the actuating device 118.

The valve body 115 is of conical configuration and has a peripheral conical sealing surface 115a and an upper face 115b. The conical shape of the valve body 115 tapers downwardly. The valve body 115 is fixedly connected to an upper rod end 116a of the valve rod 116 via a fastening element 117, for example a screw. The conical sealing surface 115a corresponds to the conical valve seat 112g in the sealing flange 112c of the discharge port 112.

The valve rod 116 extends coaxially to the axis 100a through the body 112a in the connecting line 112d in the bearing portion 112h and through said bearing portion into the actuating device 118, said valve rod being fixedly connected by its lower rod end 116b to the actuating element 120 thereof.

The valve rod 116 is longitudinally displaceably guided in the bearing portion 112h of the discharge port 112 in a bushing 123 in the direction of the axis 100a and is sealed by a seal 124 relative to the connecting line 112d of the body 112a of the discharge port 112.

The actuating device 118 comprises a bearing flange 119 with a sleeve portion 119a, the actuating element 120, a slotted guide 121 and an energy storage element 122.

Figure 14A:
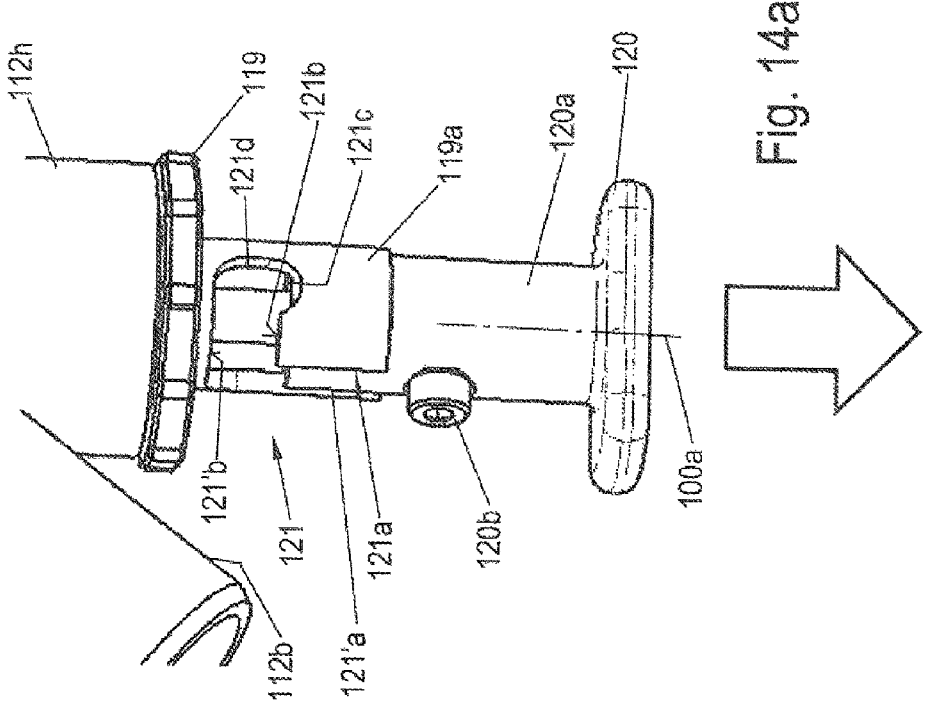
FIG. 14a shows an enlarged perspective view of the actuating device according to FIG. 14 in the closed connected position or in the closed released position.
Figure 14:
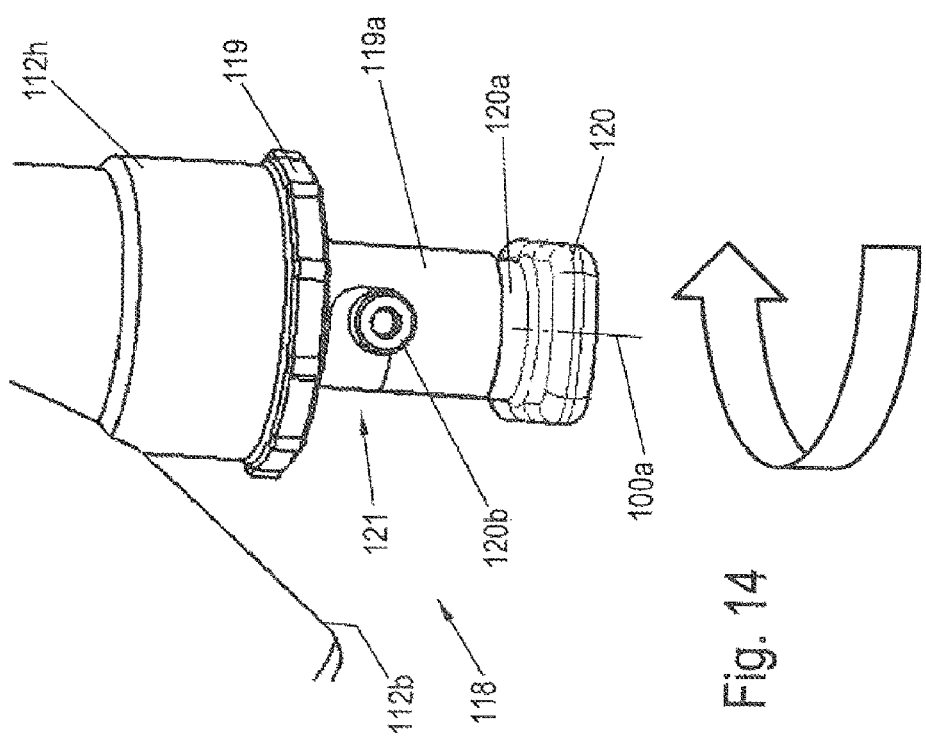
FIG. 14 shows an enlarged perspective view of an actuating device of the second exemplary embodiment according to FIG. 10 in the open connected position.

FIG. 14 shows an enlarged perspective view of the actuating device 118 of the second exemplary embodiment according to FIG. 10 in the open connected position and FIG. 14a shows an enlarged perspective view of the actuating device 118 according to FIG. 14 in the closed connected position or in the closed released position. In FIG. 15 a schematic exploded view of the second exemplary embodiment according to FIG. 10 is shown.

The actuating element 120 has a ball-shaped end which is integrally formed on a body 120a. The lower rod end 116a of the valve rod 116 is fastened in the body 120a. The body 120a is arranged so as to be longitudinally displaceably guided in the sleeve portion 119a of the bearing flange 119 in the direction of the axis 100a.

The bearing flange 119 is fixedly connected to the sleeve portion 119a and is fastened in the lower end of the bearing portion 112h of the discharge port 112. In the example shown, the bearing flange 119 is screwed into the bearing portion 112. In this case via the energy storage element 122 the bearing flange presses the bushing 123 against the seal 124 which bears axially against a shoulder of an internal bore 112i of the bearing portion 112h. In this manner the seal 124 may be re-adjusted if required.

The actuating element 120 is provided with a guide element 120b which protrudes radially from the body 120a of the actuating element 120. The guide element 120b may, for example, be a pin or a screw, for example an internal hexagon screw with a cylindrical head. In this case, said screw is at the same time a fastening element which connects the lower rod end 116b of the valve rod 116 to the actuating element 120.

The head of the guide element 120b is guided in the slotted guide 121, whereby the positions of the valve mechanism 114 are fixed, as is described in more detail below and is able to be clearly identified from FIGS. 14 and 14a.

The slotted guide 121 is integrally formed in the wall of the sleeve portion 119a. Two axial portions 121a and 121'a extend upwardly in parallel starting from a lower end of the sleeve portion 119a, with a peripheral spacing from one another in the axial direction of the axis 10a. The peripheral spacing corresponds to the diameter of the head of the guide element 120b. The one axial portion 121a then transitions at right angles into a peripheral portion 121b, to which a further peripheral portion 121'b axially parallel thereto is assigned at an axial spacing which is slightly larger than the diameter of the head of the guide element 120b. This peripheral portion 121'b starts at the end of the other axial portion 121'a. The peripheral portion 121b transitions into a downwardly extending arcuate portion 121c which then transitions into an axially upwardly extending stop portion 121d. The axially extending stop portion 121d then leads at its upper end into a further arcuate portion in the upper peripheral portion 121'b.

In the open connected position shown in FIG. 11, the valve mechanism 114 is open. In this case, the valve body 115 is located in the valve chamber 110e and a through-passage between the feeding port 110 and the discharge port 112 is open. Thus a connection is provided between the milking module 1 and the milk pipe.

The actuating element 120 of the actuating device 118 in this position is pushed by the valve rod 116 and by the valve body 115 upwardly against the force of the energy storage element 122 and, viewed from below, rotated clockwise such that the guide element 120b is arranged in the arcuate portion 121c of the slotted guide 121. Due to the tensioned energy storage element 122 the guide element 120b is forced downwardly into the arcuate portion 121c, whereby the open position of the valve mechanism 114 is maintained.

For adopting the closed connected position of the quick-coupling device 100, initially the valve mechanism 114 is closed. To this end, the actuating element 120 is forced upward counter to the force of the energy storage element 122 so that the guide element 120b, viewed from below, may be moved out of the arcuate portion 121c by rotating the actuating element 120 about the axis 100a counterclockwise over the peripheral portion 121b into the axial portions 121a, 121'a. When the guide element 120b has arrived in the axial portions 121a, 121'a, it is able to move freely downwardly axially in the direction of the axis 100a, wherein the actuating element 120, the valve rod 116 connected thereto and the valve body 115 may be pushed downward.

Finally, the sealing surface 115a of the valve body 115 comes to bear against the valve seat 112g of the sealing flange 112c of the discharge port 112. Thus the closed position of the valve mechanism 114 is adopted. The valve body 115 is pressed by the remaining pretensioning force of the energy storage element 122 against the valve seat 112g. Additionally, the force of the vacuum acts on the valve body 115 in order to maintain the closed position. This is shown in FIG. 12 in the closed connected position.

The slotted guide 121 with the guide element 120b may also be described, for example, as a curved track with a latching function. In other words, the functional unit, the actuating device 118 of the valve mechanism 114, is a so-called mechanical RS flip-flop with two stable states, namely with the valve mechanism 114 closed and with the valve mechanism 114 open.

Now both articulated clamps 4 may be released and the milking module 1 with the feeding portion 110 may be dismantled. Thus the closed released position shown in FIG. 13 is reached. In this position, the sealing flange 112c including the upper face 115b of the valve body 115 may be cleaned and disinfected. The vacuum may be maintained in the discharge port 112.

The other positions are set in reverse sequence as described above.

The above-described exemplary embodiments do not limit the invention. The invention is able to be modified within the scope of the accompanying claims.

Thus, for example, it is conceivable that for accurate positioning about the axis 10a the sliding clamp 5 has a stop and/or a latching position, for example in combination with the peripheral collar 12g of the discharge port 12.

The actuating device 118 could also be configured as a mechanical T flip-flop. In this case, a first pressure on the actuating element 120 would switch on the open position of the valve mechanism 114 and a second pressure would readjust the valve mechanism 114 from the open position into the closed position.

The actuating device 118 may be provided with an actuator, instead of manual actuation or additionally thereto. This actuator may, for example, be a pneumatic or hydraulic cylinder, a magnetic switch, a servomotor, or the like.

The invention claimed is:

1. A quick-coupling device for a milking module of a milking system for milking dairy animals, wherein the quick-coupling device forms a releasable and re-establishable milk pipe connection to the milking module, and the quick-coupling device comprises:
   a valve mechanism movable between a closed state and an open state;
   a feeding port having a milking module end and a second end, and including a feeding port sealing flange with a feeding seal;
   a discharge port having a first end and a milk pipe end, and a discharge port sealing flange engaged with the feeding seal and with a discharge seal of the first end of the discharge port and with the sliding clamp;
   a first clamp releasably joined to the feeding port milking module end;
   a second clamp releasably joined to the feeding port second end and the discharge port first end, and the second clamp is a sliding clamp defining a slot; and
   the valve mechanism is at least partially arranged between the second end of the feeding port and the first end of the discharge port.

2. A quick-coupling device for a milking module of a milking system for milking dairy animals, wherein the quick-coupling device forms a releasable and re-establishable milk pipe connection to the milking module, and the quick-coupling device comprises:
   a valve mechanism movable between a closed state and an open state, and the valve mechanism comprises:
      a feeding seal;
      a discharge seal; and
      a slide movable between the feeding seal and the discharge seal to move the valve mechanism between the open state and the closed state;
   a feeding port having a milking module end and a second end;
   a discharge port having a first end and a milk pipe end;
   a first clamp releasably joined to the feeding port milking module end; and
   a second clamp releasably joined to the feeding port second end and the discharge port first end.

3. The quick-coupling device of claim 2, wherein the valve mechanism is in the open state when the slide is removed from between the feeding seal and the discharge seal, and in the closed state when the slide is arranged between the feeding seal and the discharge seal.

4. The quick-coupling device of claim 2, wherein the slide is received and held between the feeding seal and the discharge seal in a contact plane in which the feeding seal and the discharge seal are in contact with one another when the valve mechanism is in the closed state.

5. The quick-coupling device of claim 2, and the discharge port sealing flange comprises:
   a slide guide having guide slots integrally formed in segments and including a latching portion which in the closed state of the valve mechanism is in engagement with a latching opening of the inserted slide.

6. The quick-coupling device of claim 5, wherein the segments of the sealing flange of the discharge port protrude in an axial direction of the feeding port, and recesses are arranged between the segments in the axial direction of the feeding port, and the recesses are countersunk relative to the segments and forming with the segments a profile engaged with a lower face of the sealing flange of the feeding port, and in a non-rotational manner.

7. The quick-coupling device of claim 2, wherein in the closed position of the valve mechanism, the slide extends through a slot defined by the sliding clamp.

8. The quick-coupling device of claim 2, wherein in the closed position of the valve mechanism, the slide forms a sealed connection with the discharge seal when the first clamp, the second clamp, and the feeding port are removed.

9. A quick-coupling device for a milking module, the quick-coupling device comprising:
   a feeding port including a milking module end and a second end wherein the feeding port second end includes:
      a feeding port sealing flange;
   a discharge port having a first end and a milk pipe end and a discharge port sealing flange releasably engaged with the feeding port;
   a seal is arranged between the feeding port sealing flange and the discharge port sealing flange;
   a first clamp releasably joined to the feeding port milking module end;
   a second clamp releasably joined to the feeding port second end and the discharge port first end, wherein the first clamp and the second clamp are of substantially the same configuration;
   a valve mechanism movable between a closed state and an opened state; and the valve mechanism is arranged between the second end of the feeding port and the first end of the discharge port.

10. The quick-coupling device of claim 9, wherein the valve mechanism comprises:
a valve body;
a valve rod operatively engaged with the valve body;
a valve seat in the sealing flange of the discharge port; and
an actuator operatively engaged with the valve rod.

11. The quick-coupling device of claim 10, wherein the valve body is fixedly connected to an upper rod end of the valve rod, a sealing surface of the valve body corresponds to the valve seat in the sealing flange of the discharge port, and in the closed state of the valve mechanism, the valve body closes the valve seat with its sealing surface, and in the open state of the valve mechanism the sealing surface of the valve body is spaced apart from the valve seat.

12. The quick-coupling device of claim 10, wherein the valve rod extends through a connecting line of a body of the discharge port into a bearing portion of the discharge port and through the bearing portion into the actuator, and wherein a lower rod end of the valve rod is fixedly connected to an actuator body of the actuator.

13. The quick-coupling device of claim 12, wherein the valve rod in the bearing portion of the discharge port is longitudinally displaceably guided in a bushing and is sealed by a seal relative to the connecting line of the body of the discharge port.

14. The quick-coupling device of claim 10, wherein the actuator comprises:
a bearing flange with a sleeve portion;
an actuator body slidably disposed in the sleeve portion; and
a slotted guide.

15. The quick-coupling device of claim 14, wherein the slotted guide is integrally formed in a wall of the sleeve portion and, with a radially extending guide connected to the actuator body, forms a stable state, in both the closed state and the open state.

16. The quick-coupling device of claim 9, wherein at least one portion of the feeding port and at least one portion of the discharge port are arranged coaxially relative to one another.

* * * * *